United States Patent
Van Lydegraf et al.

(10) Patent No.: US 9,250,745 B2
(45) Date of Patent: Feb. 2, 2016

(54) DETERMINE THE CHARACTERISTICS OF AN INPUT RELATIVE TO A PROJECTED IMAGE

(75) Inventors: Curt N. Van Lydegraf, Eagle, ID (US); Robert Campbell, Cupertino, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 499 days.

(21) Appl. No.: 13/008,286

(22) Filed: Jan. 18, 2011

(65) Prior Publication Data

US 2012/0182263 A1  Jul. 19, 2012

(51) Int. Cl.
*G06F 3/042* (2006.01)

(52) U.S. Cl.
CPC .............. *G06F 3/0425* (2013.01); *G06F 3/042* (2013.01)

(58) Field of Classification Search
CPC ... G06F 3/0412; G06F 3/0425; G06F 3/0421; G03B 17/54; G03B 21/2066; G03B 21/26; G03B 21/28; G03B 21/10; G03B 21/00
USPC ........ 348/744; 355/28; 353/28; 345/175, 173
See application file for complete search history.

(56) References Cited

U.S. PATENT DOCUMENTS

| | | | |
|---|---|---|---|
| 7,234,819 B2 * | 6/2007 | Nonaka et al. | 353/69 |
| 7,432,917 B2 * | 10/2008 | Wilson et al. | 345/175 |
| 7,576,727 B2 * | 8/2009 | Bell | 345/158 |
| 7,599,561 B2 | 10/2009 | Wilson et al. | |
| 7,710,391 B2 | 5/2010 | Bell et al. | |
| 8,121,640 B2 | 2/2012 | Russ et al. | |
| 8,199,117 B2 | 6/2012 | Izadi et al. | |
| 8,289,288 B2 * | 10/2012 | Whytock et al. | 345/173 |
| 8,411,931 B2 | 4/2013 | Zhou et al. | |
| 8,736,583 B2 | 5/2014 | Anderson et al. | |
| 2005/0078092 A1 | 4/2005 | Clapper | |
| 2007/0139397 A1 | 6/2007 | Cross | |
| 2008/0018591 A1 | 1/2008 | Pittel et al. | |
| 2010/0103330 A1 * | 4/2010 | Morrison et al. | 348/744 |
| 2010/0177931 A1 * | 7/2010 | Whytock et al. | 382/103 |
| 2011/0058023 A1 | 3/2011 | Boles et al. | |
| 2011/0242054 A1 | 10/2011 | Tsu | |
| 2011/0267478 A1 | 11/2011 | Jacobs | |
| 2011/0292347 A1 * | 12/2011 | Zhang et al. | 353/28 |
| 2012/0154695 A1 | 6/2012 | Laduke et al. | |
| 2012/0314030 A1 | 12/2012 | Datta et al. | |
| 2013/0077236 A1 | 3/2013 | Becze et al. | |
| 2014/0215389 A1 | 7/2014 | Walsh | |

OTHER PUBLICATIONS

"Smart Tech Inc. to Showcase 'Smart Board interactive Display Frame'"; http://www.youtube.com/watch?v=JHtXTFIp0DQ&feature=related.
SMART Technologies; http://smarttech.com/.

(Continued)

*Primary Examiner* — Quan-Zhen Wang
*Assistant Examiner* — Xuemei Zheng
(74) *Attorney, Agent, or Firm* — Hewlett-Packard Patent Department

(57) ABSTRACT

Embodiments disclosed herein relate to an input relative to an image projected onto a projection surface. In one embodiment, a processor may determine the characteristics of an input relative to an image projected onto a projection surface. The input characteristics may be determined based on information from an optical sensor.

19 Claims, 5 Drawing Sheets

(56) References Cited

OTHER PUBLICATIONS

Whatley, Tiesha; "How Do Smart Boards Work?"; http://www.ehow.com/how-does_4564507_smart-boards-work.html.

Shahram Izadi et al., "C-Slate: A Multi-Touch and Object Recognition System for Remote Collaboration using Horizontal Surfaces," Second Annual IEEE International Workshop on Horizontal Interactive Human-Computer System, 2007, pp. 3-10, IEEE.

* cited by examiner

DETERMINE THE CHARACTERISTICS OF AN INPUT RELATIVE TO A PROJECTED IMAGE

BACKGROUND

Display systems receiving input via user interaction, such as touch input gesture input, are becoming increasingly common. In some cases, display systems receiving input via user interactions are designed to be viewable by multiple people. For example, a display may hang on a wall such that a user giving a presentation may touch the display in front of an audience.

BRIEF DESCRIPTION OF THE DRAWINGS

In the accompanying drawings, like numerals refer to like components or blocks. The drawings describe example embodiments. The figures include flow charts with steps listed in an example order, but the steps may be performed in any suitable order. The following detailed description references the drawings, wherein.

DETAILED DESCRIPTION

Figure 1:
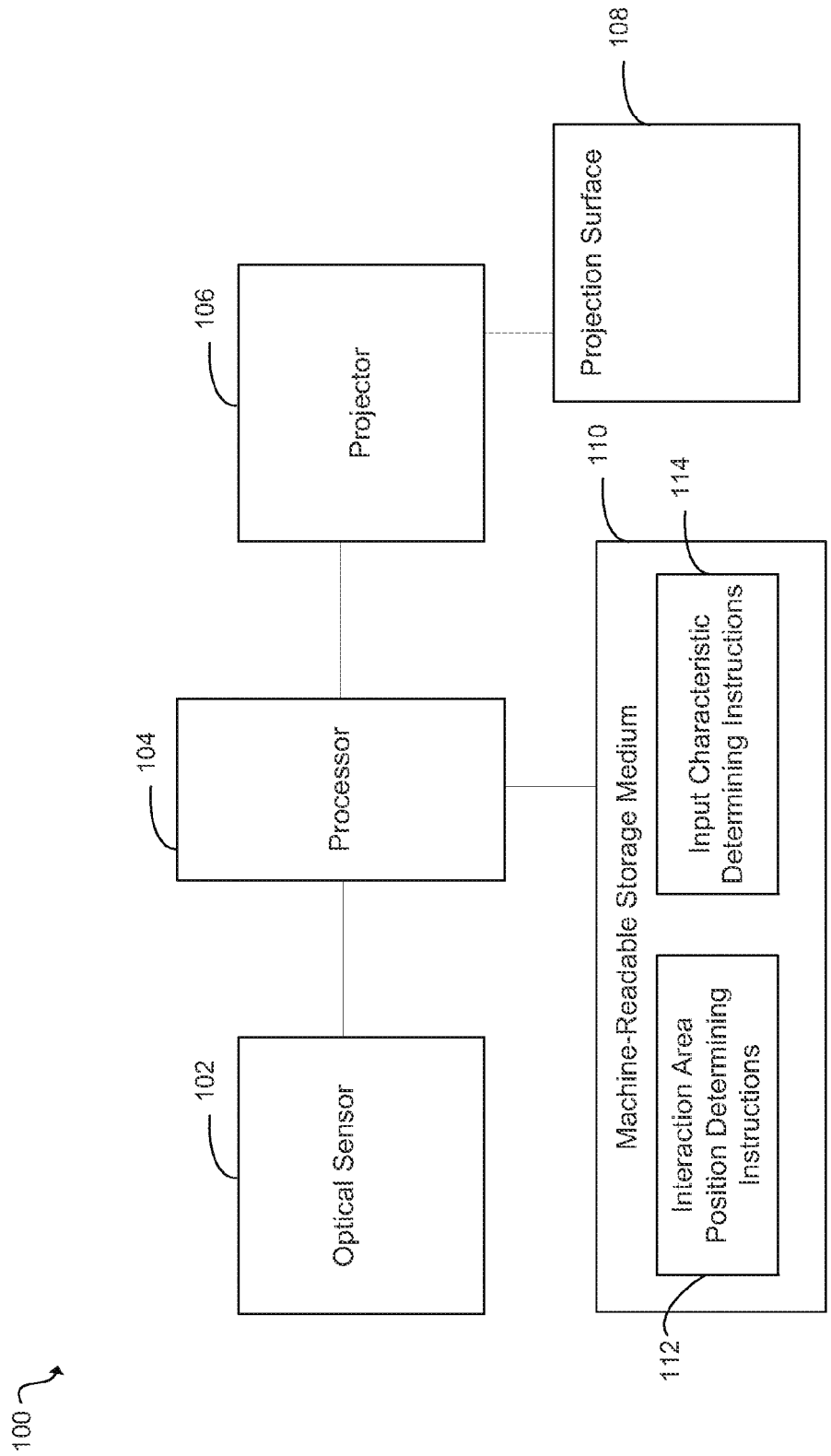
FIG. 1 is a block diagram illustrating one example of a display system for determining the position of an interaction area on a projection surface.

Display systems may be designed to be viewable by multiple people. For example, a display may hang on a wall, and a presenter may use a keyboard or mouse to communicate with the display. In some cases, a user may interact with such a display by touching the front of the display, which may include touch sensors. Unfortunately, an electronic device, such as a Liquid Crystal Display (LCD), viewable by multiple users for displaying an image and receiving touch input to the image may be expensive and bulky.

In other cases, a user may interact with a projected image, such as an image projected onto a board. For example, the display may be a large white board that may be hung on a wall with an image projected onto the white board, such as an image projected by a projector attached to the white board. The display may include resistive or capacitive sensors for receiving touch input. Problematically, a display for receiving a projected image may be difficult to transport and may have a confined display area or display dimensions, which may be limited to the dimensions of the white board.

To address these issues, example embodiments disclosed herein relate to a portable display system. A display system may include an optical sensor, and the optical sensor may be positioned to form an interaction area on a projection surface. For example, the optical sensor may be placed in one position on a wall to create an interaction area on one part of the wall, and the optical sensor may be moved to another part of the wall to create an interaction area on another part of the wall. A projector may be posited to project an image within the interaction area such that the optical sensor may sense an input to the projected image. Because the interaction area may be altered based on the positioning of the optical sensor, it may be useful to have a method for locating the interaction area and determining its dimensions. For example, for input to a projected image to be interpreted, the optical sensor may be positioned such that an image projected onto the projection surface is within the range of the optical sensor, such as where the optical sensor may sense a touch or gesture input to the projected image. In addition, the dimensions of the image may be used to determine which portion of an image was indicated by a touch or gesture input. In one embodiment, a processor may determine the location of the interaction area. A projector may project an image on the interaction area, and the optical sensor may sense an input, such as a touch input, to the projected image. In some cases, the optical sensor may sense three-dimensional aspects of an input relative to the projected image, such as a gesture with respect to the image projected in the interaction area.

Using an optical sensor to create an interaction area and a projector to project an image within the interaction area may provide flexibility. For example, a projector and optical sensor may in some cases be moved from one conference room to another more easily than moving a large electronic display device. The projection surface may be, for example, a wall or portable screen. In addition, a projection surface may allow the dimensions of a projected image to be altered based on, for example, its purpose or the distance of the audience from the projection surface.

FIG. 1 is a block diagram illustrating one example of a display system 100. The display system 100 includes an optical sensor 102, a processor 104, a projector 106, a projection surface 108, and a machine-readable storage medium 110. In one implementation, the projector 106 projects an image onto the projection surface 108. A user may interact with the image, such as by touching the image on the projection surface 108, and the optical sensor 102 may sense characteristics of the input, such as the position or color of the input. The processor 104 may interpret the sensed characteristics to determine the meaning of the input.

The processor 104 may be any suitable processor, such as a central processing unit (CPU), a semiconductor-based microprocessor, or any other device suitable for retrieval and execution of instructions. In one embodiment, the display system 100 includes logic instead of or in addition to the processor 104. As an alternative or in addition to fetching, decoding, and executing instructions, the processor 104 may include one or more integrated circuits (ICs) or other electronic circuits that comprise a plurality of electronic components for performing the functionality described below. In one implementation, the display system 100 includes multiple processors. For example, one processor may perform some functionality and another processor may perform other functionality. The processor 104 may be included within an electronic device, such as a desktop, notebook, slate, or mobile computing device.

The projector 106 may be any hardware device suitable for projecting beam of light to form an image on the projection surface 108. The projector 106 may project an image onto the projection surface 108. In some cases, the projector 106 may be moved relative to the projection surface 108. For example, the projector 106 may project an image to create a display area on one wall and then be moved such that it creates a display area on another wall or a different portion of the same wall. The projector 106 may be positioned to project in any suitable direction, such as horizontally towards a wall or vertically towards a floor or ceiling. The projection surface 108 may be any suitable projection surface. For example, the projection surface 108 may be a wall, table, screen, floor or board. In some cases, the projection surface 108 may not be specifically tailored as a projection surface. For example, the projection surface 108 may be a regular wall selected to have an image projected onto it.

The projector 106 may communicate with the processor 104 such as through a communication bus or via a network. The projector 106 and the processor 104 may communicate wirelessly. In one implementation, the processor 104 and the projector 106 are included in the same electronic device. The projector 106 may project an image received from the processor 104. For example, the processor 104 may be included in an electronic device, and an image may be sent to the projector 106 instead of or in addition to being displayed on a display associated with the electronic device.

The optical sensor 102 may be any suitable optical sensor. For example, the optical sensor 102 may be a camera, such as a camera for determining a position of an input. In one embodiment, the optical sensor is an optical light sensor for sensing the position of a touch or hover position along the projection surface 108. For example, the optical sensor 102 may include a grid of sensors, such as infrared light transmitter on one side of the projection surface 108 and infrared receivers positioned along another side of the projection surface 108 to determine whether the transmitted light was interrupted. For example, the light may be interrupted by a touch or hover over the projection surface 108. The optical sensor 102 may be a two-dimensional or three-dimensional optical sensor. For example, the optical sensor 102 may be a camera or multiple cameras for sensing a three-dimensional image. The display system 100 may include multiple optical sensors, and the sensors may be of the same types or of different types. In some cases, the display system 100 may include the optical sensor 102 as well as other types of input sensors, such as a capacitive or resistive touch sensor.

The optical sensor 102 may be placed in any suitable position. For example, a customer may receive the projection surface 108 with the optical sensor 102 attached. In one implementation, the optical sensor 102 is portable such that it may be temporarily attached to the projection surface 108 or another structure. For example, the optical sensor 102 may be attached to the projection surface 108 where the projection surface 108 is a wall. The optical sensor 102 may be attached to a wall or other structure where the projection surface 108 is a screen, such as a wall next to a screen serving as the projection surface 108. In one implementation, the optical sensor 102 may be moved relative to the projection surface 108. For example, the optical sensor 102 may be a camera that may be temporarily attached to a wall in one conference room and then attached to a white screen in a different conference room.

The optical sensor 102 may communicate with the processor 104 in any suitable manner. For example, the optical sensor 102 may communicate with the processor 104 either directly or via a network. In one embodiment, the optical sensor 102 communicates with the processor 104 via a wireless network. This may allow the optical sensor 102 to be portable along the projection surface 108 and may allow the projector 106 and the processor 104 to be positioned at a distance from the projection surface 108 and the optical sensor 102. The optical sensor 102 may communicate information about an input to an image on the projection surface to the processor 104, such as information about the position, pose, angle, or motion of an input.

The display system 100 also includes a machine-readable storage medium 110. The machine-readable storage medium 110 may be any suitable machine readable medium, such as an electronic, magnetic, optical, or other physical storage device that stores executable instructions or other data (e.g., a hard disk drive, random access memory, flash memory, etc.). The machine-readable storage medium 110 may be, for example, a computer readable non-transitory medium. The machine-readable storage medium 110 may include instructions executable by the processor 104. For example, the machine-readable storage medium 110 may include interaction area position determining instructions 112 and input characteristic determining instructions 114.

The interaction area position determining instructions 112 may include instructions to evaluate the sensing capabilities of an optical sensor relative to a projection surface and determine based on the sensing capabilities the position of an interaction area on the projection surface. In one embodiment, the processor 104, such as by executing the interaction area position determining instructions 112, determines the position of an interaction area on the projection surface 108. The interaction area may be the area on the projection surface 108 where the optical sensor 102 may sense an input to a projected image. In some cases, the projected image may be outside of the interaction area. The processor 104 may determine that the projected image is not within the range of the optical sensor 102 and indicate the fact that the image is outside the range, such as by displaying a message on an electronic device associated with the processor 104. In some cases, the projected image may be projected within the interaction area, and the processor 104 may determine the position of the projected image within the interaction area. Information about the position of the projected image within the interaction area may be used to determine the meaning of an input to the projected image, such as which portion of the projected image is touched.

The input characteristic determining instructions 114 may include instructions to determine the characteristics of an input relative to an image projected onto the interaction area based on information from the optical sensor. For example, the input characteristic determining instructions 114 may include instructions to determine the characteristics of a touch or gesture input relative to an image projected in an interaction area of the projection surface 108. The characteristics may include any suitable characteristics, such as position, pose, motion, or color.

Figure 2A:
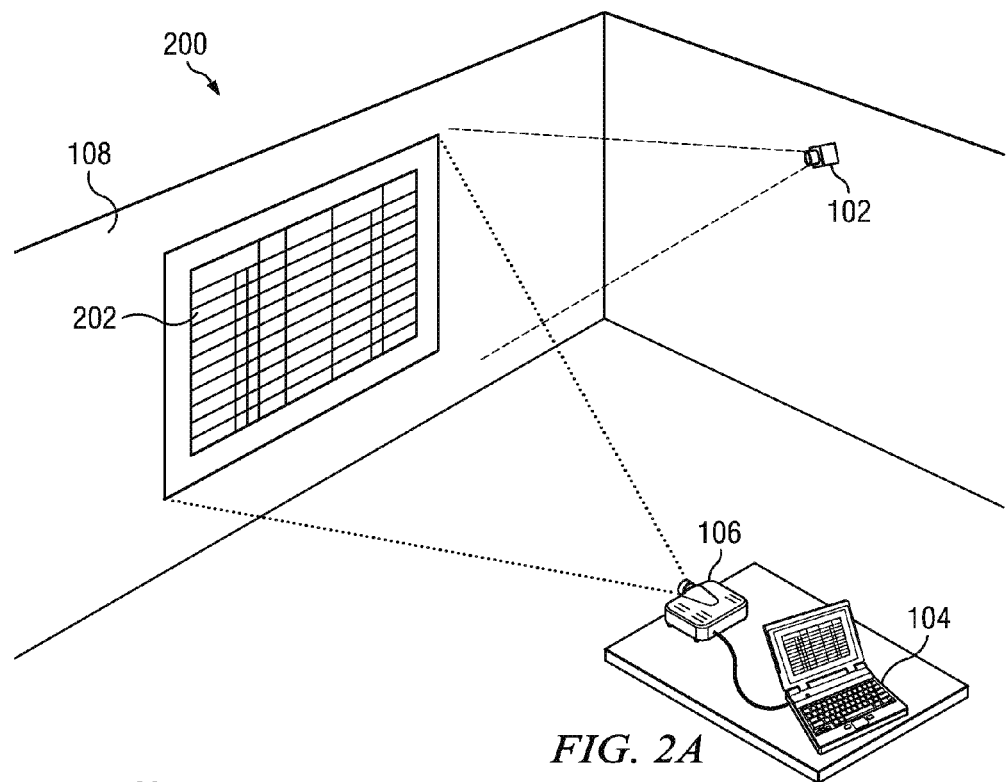
FIG. 2A is a diagram illustrating one example of a display system configuration created by a position of a projector and an optical sensor.

FIG. 2A is a diagram illustrating one example of a display system configuration 200 created by a position of a projector and an optical sensor. In one embodiment, an interaction area for a projected image is a set area, such as a board with a three-dimensional optical sensor attached. In one embodiment, an interaction area is created based on the position of the optical sensor 102. For example, the optical sensor 102 may be capable of sensing inputs within a certain distance or direction of the optical sensor 102. An input to the projection surface 108 outside of the range of the optical sensor 102 may in some cases not be detected. The processor 104 may determine an interaction area based on the position of an optical sensor, such as using manual or automatic calibration techniques.

In one embodiment, the display system configuration may be updated. For example, the projector 106 or the optical sensor 102 may be moved relative to a projection surface. The display system configuration 200 includes the optical sensor 102, the projector 106, the processor 104, and the projection surface 108. The projector 106 may project an image 202 on the projection surface 108 such that the optical sensor 102 may sense an input relative to the image 202 projected onto an interaction area on a first wall.

Figure 2B:
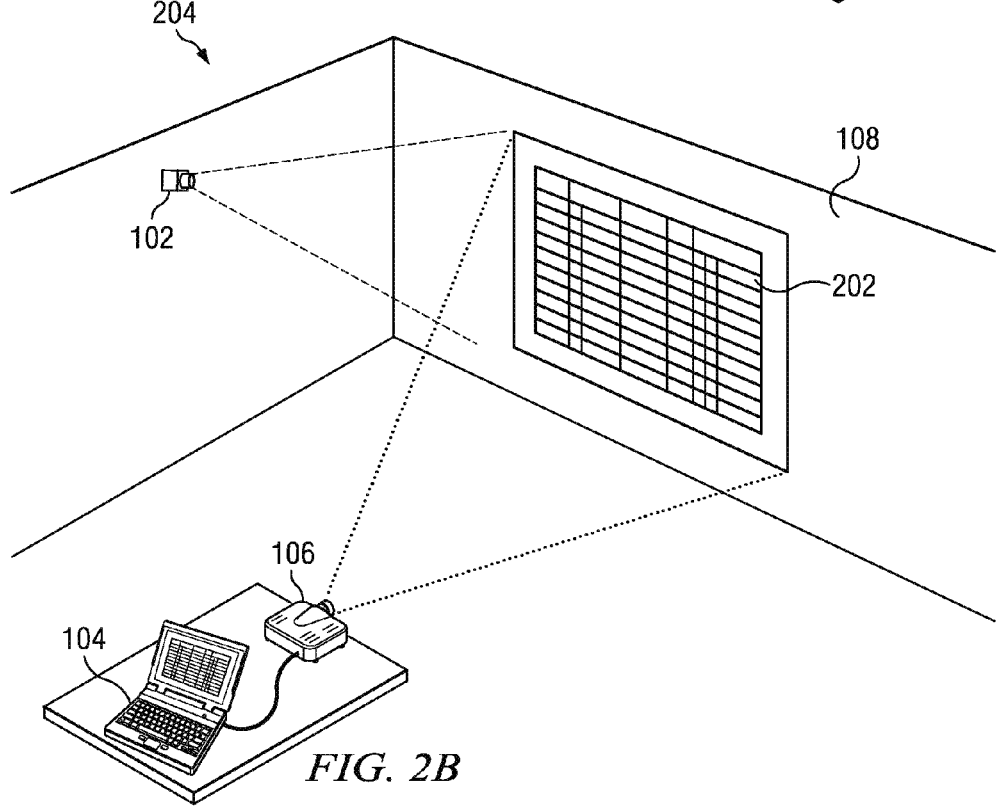
FIG. 2B is a diagram illustrating one example of a display system configuration created by a position of a projector and an optical sensor.

FIG. 2B is a diagram illustrating one example of a display system configuration 204 created by a position of a projector and an optical sensor. The display system configuration 204 includes the optical sensor 102, the projector 106, the processor 104, and the projection surface 108. In one embodiment, the optical sensor 102 may be moved to create a different interaction area. The display system configuration 204 shows the projector 106 and the optical sensor 102 moved relative to the projection surface 108 such that the optical sensor 102 may sense an input to an image projected in an interaction area on a second wall. The interaction area may be in a different position than the interaction area for the display system configuration 200. The projector 106 may be positioned to project the image 202 onto the interaction area of the second wall.

Because the location and size of the interaction area may change based on the sensing range of the optical sensor, it may be useful to determine the position of the interaction area. In one implementation, the position of the projector 106 may be changed so that the projector 106 projects an image within the interaction area. In some cases, the image projected may be made smaller such that the projector 106 may be in the same position, but the image fits within the interaction area. In some cases, the projector 106 may have a lens that is automatically moved towards an updated interaction area. In one embodiment, the user may move the projector 106 and the processor 104 alerts the user when the projector is in the proper position that the projected image is within the sensing range of the optical sensor 102.

In some cases, the projection surface 108 may be moved if the position of the optical sensor 102 is changed. For example, a white screen may be moved to a position where the projector 106 projects an image on it. In some cases, a different projection surface may be used. For example, the projector 106 may project an image on a wall, and the projector 106 and the optical sensor 102 may be moved such that the projector 106 projects an image on a different wall. In some cases moving the optical sensor 102 and the projector 106 to create a different display area and interaction area may be easier than moving a large electronic device, such an LCD screen receiving touch and gesture input. The projected image may in some cases be within the interaction area, and a processor may determine the position of the projected image within the interaction area so that inputs to the projected image may be interpreted.

Figure 3:
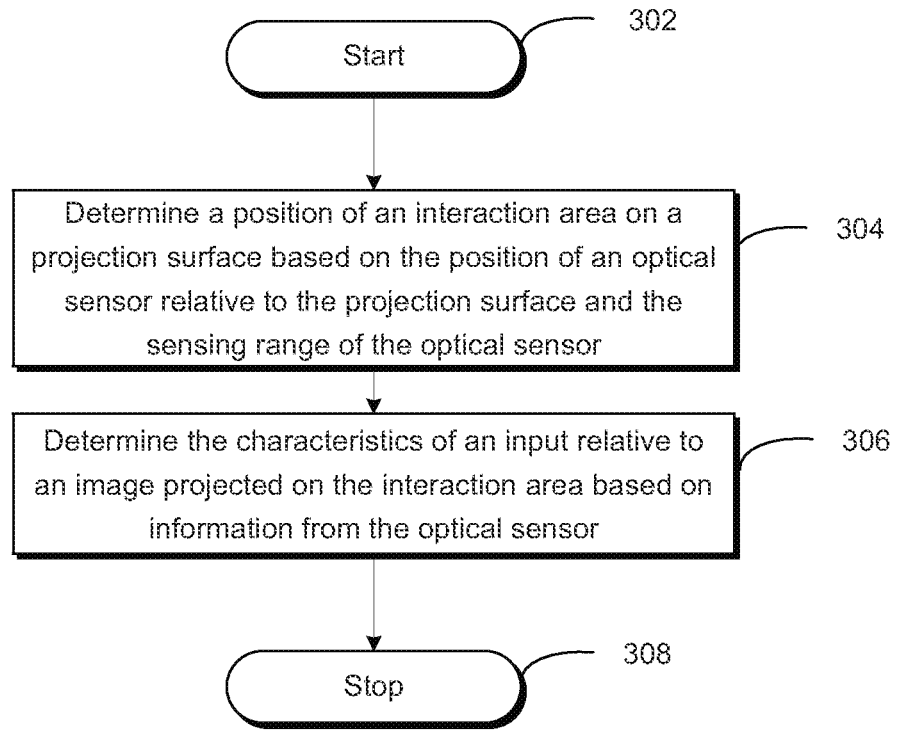
FIG. 3 is a flow chart illustrating one example of a method for determining the position of an interaction area on a projection surface.

FIG. 3 is a flow chart illustrating one example of a method 300 for determining the position of an interaction area on a projection surface. A processor may evaluate the sensing capabilities of an optical sensor to determine the position of the interaction area on the projection surface. For example, the interaction area may be the area in which an optical sensor is capable of sensing an input relative to the projection surface. A projector may project an image onto the interaction area, and the processor may determine the characteristics of an input, such as a touch or gesture input, relative to the image based on information from the optical sensor. The method 300 may be implemented, for example, using the display system 100.

Beginning at 302 and moving to 304, a processor determines a position of an interaction area on a projection surface based on the position of an optical sensor relative to the projection surface and the sensing range of the optical sensor. The processor may be any suitable processor, such as the processor 104. The processor may be housed in an electronic device, such as a desktop, notebook, or slate computer. The processor may execute instructions stored in a machine-readable storage medium, such as the machine-readable storage medium 102, to determine the position of the interaction area.

The optical sensor may be any suitable optical sensor, such as a camera for sensing two-dimensional or three-dimensional inputs. The optical sensor may be, for example, the optical sensor 102. The optical sensor may be positioned relative to a projection surface, such as attached to or in front of a projection surface. The projection surface, such as the projection surface 108, may be any suitable projection surface, for example, a table, wall, screen, or board. A projector, such as the projector 106, may project an image onto the projection surface.

The processor may determine the position of the interaction area in any suitable manner. Determining the position of the interaction area may include, for example, determining the location and size of the interaction area. The position of the interaction area may be affected by the sensing capabilities of the optical sensor. The interaction area may or may not intersect with a display area created by the projector. For example, the optical sensor may not be able to sense the entire area where the projector may project an image, or the range of the optical sensor may be greater than the area of an image projected by the projector. In some cases, the position of the optical sensor may be changed to update the location or size of the interaction area, or the position of the projector may be changed such that the display area coincides with the interaction area. For example, the projector may be moved away from the projection surface so that the projected image is larger or may be moved towards the projection surface so that the projected image appears smaller.

In one embodiment, multiple optical sensors may be used to create an interaction area. For example, each optical sensor may be placed to create a corner or other portion of an interaction area. The optical sensors may be placed closer together to create a smaller interaction area and farther apart to create a larger interaction area.

In one implementation, the processor determines the position of the interaction area based on user input to the projection surface. For example, the processor may send an image to the projector for the projector to project onto the projection surface. A user may touch a portion of the projected image, such as an object in each of the corners of the projected image. The user may touch the projected image, for example, in response to instructions displayed in the projected image or on a display device associated with the processor. The processor may determine whether the optical sensor was able to measure the touch input to the projected image and the position of the input if measured. If the optical sensor was unable to detect the input, the processor may provide instructions, such as instructions displayed on the projected image, displayed on a display associated with the processor, or otherwise communicated to a user, that the projected image is outside of the detected interaction area. As a result, a user may move the projector so that the image is projected at a different area, such as closer to the optical sensor, or may move the optical sensor, such as closer to the projected image.

In one embodiment, the optical sensor is used to automatically calibrate the interaction area. For example, the projector may project an image onto the projection surface and the processor may determine whether the optical sensor was able to sense the projected image. The projector may continue to project images in different areas to determine the outer bounds of the ability of the optical sensor's sensing abilities. For example, the optical sensor may sense an image projected in a first location, but may not be able to sense an image projected in a second location. In some cases, the optical sensor may be unable to detect images in multiple locations, and the processor may provide an instruction, such as an instruction displayed on the display surface or on a display device associated with the processor, to move the projector relative to the optical sensor.

Figure 4A:
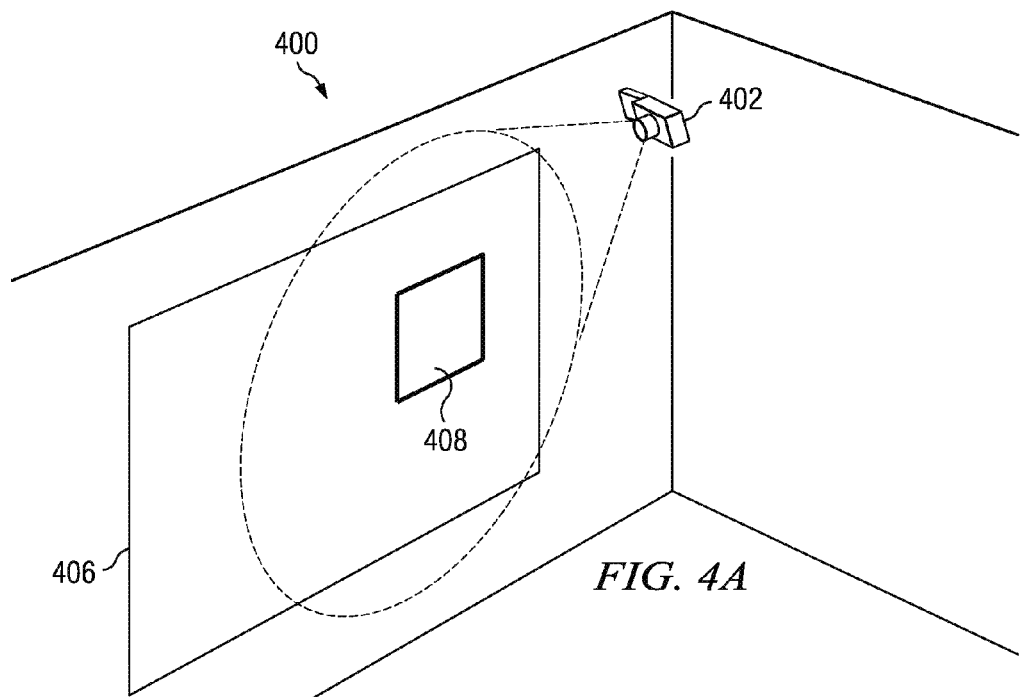
FIG. 4A is a diagram illustrating one example of determining the position of an interaction area on a projection surface based on information from an optical sensor.

FIG. 4A is a diagram illustrating one example 400 of determining the position of an interaction area on a projection surface based on information from an optical sensor. For example, the processor may automatically calibrate the interaction area, such as by measuring the optical sensor's ability to sense a projected calibration image. An image 408 is projected onto a projection surface 406. For example, a processor may instruct a projector to project in image in a particular location. The projection surface 406 may be a screen, wall, or electronic device. The projection surface 406 may be, for example, the projection surface 108. An optical sensor 402 may sense the projected image 408. The optical sensor 402 may be any suitable optical sensor, such as a two-dimensional or three-dimensional optical sensor. The optical sensor 402 may be, for example, the optical sensor 102. The optical sensor 402 may sense the image 408 and communicate information about the sensed image to a processor. The processor may determine that the image 408 is within the interaction area because it is within the range of the optical sensor 402.

Figure 4B:
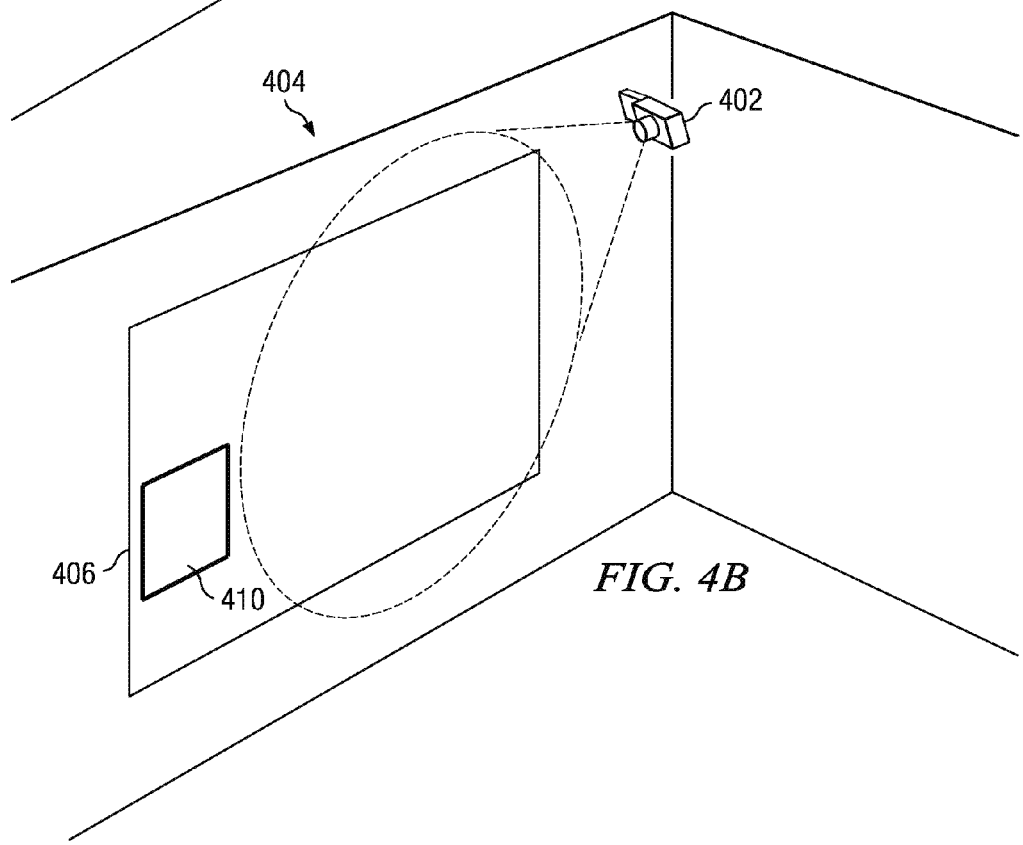
FIG. 4B is a diagram illustrating one example of determining the position of an interaction area on a projection surface based on information from an optical sensor.

FIG. 4B is a diagram illustrating one example 404 of determining the position of an interaction area on a projection surface based on information from an optical sensor. The processor may instruct the projector to project a second image 410 in a different location from the first image 408, such as by sending an image to the projector for display where a different portion of the image includes a colored object. The optical sensor 402 may fail to detect the second image 410, which may indicate that the second image 410 is outside of the interaction area.

In one embodiment, a projector may project an image, and the processor may determine whether the image is detected by the optical sensor 402. A user or an automatic device may continue to move the projector relative to the optical sensor 402 until the processor indicates that the optical sensor 402 detected the projected image.

Referring back to FIG. 3 and proceeding to 306, a processor, such as by executing instructions stored in a machine-readable storage medium, determines the characteristics of an input relative to an image projected onto the interaction area based on information from the optical sensor. For example, the processor may determine the position of a touch input to the projected image based on information from the optical sensor. The processor may determine the position, pose, or motion of a three-dimensional input to the projected image based on information from the optical sensor. The processor may determine the meaning of the input based on its characteristics. For example, one hand pose may be interpreted to indicate that an item should be cut and a second hand pose may be interpreted to indicate that an item should be pasted. The method 300 continues to block 308 to end.

In one embodiment, a processor may rescale an image to be projected by a projector based on the interaction area. For example, the image may be rescaled based on the size or position of the interaction area. In one implementation, the image is rescaled based on the type of projection surface used within the interaction area. For example, the image may be warped to fit the type of projection surface. The image may be rescaled linearly, such as by changing the dimensions of the image, or may be rescaled non-linearly, such as by warping the image or creating a keystone effect.

The image may be rescaled based on the size of the interaction area. For example, if the interaction area is smaller than the area in which the projector may project an image, the processor may adjust the image such that it is projected within the interaction area. The image may be rescaled instead of or in addition to moving the projector so that the projected image coincides with the range of the optical sensor.

Figure 5A:
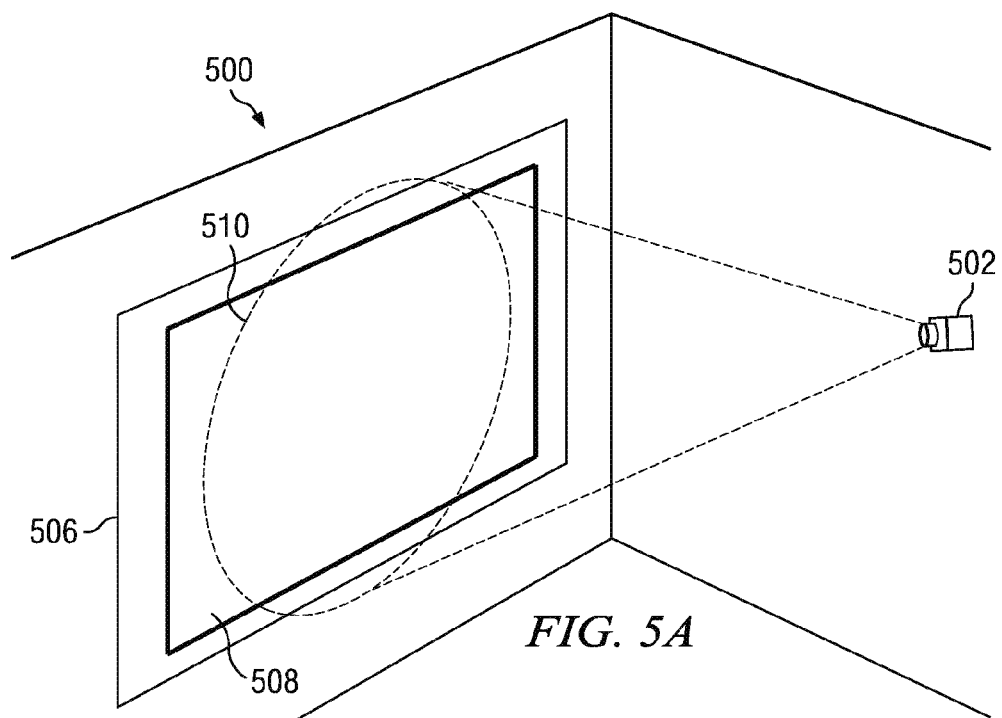
FIG. 5A is a diagram of a display system illustrating one example of rescaling an image based on the size of an interaction area on a projection surface.

FIG. 5A is a diagram of a display system illustrating one example 500 of rescaling an image based on the size of an interaction area on a projection surface. An image 508 is projected onto a projection surface 506, such as a wall, screen, or electronic device. A processor may determine that the interaction area 510 is within the range of an optical sensor 502 for measuring input relative to a projected image. However, the projector may be capable of projecting an image outside of the interaction area 510. A processor may send an image to the projector that is displayed both inside and outside of the interaction area 510.

Figure 5B:
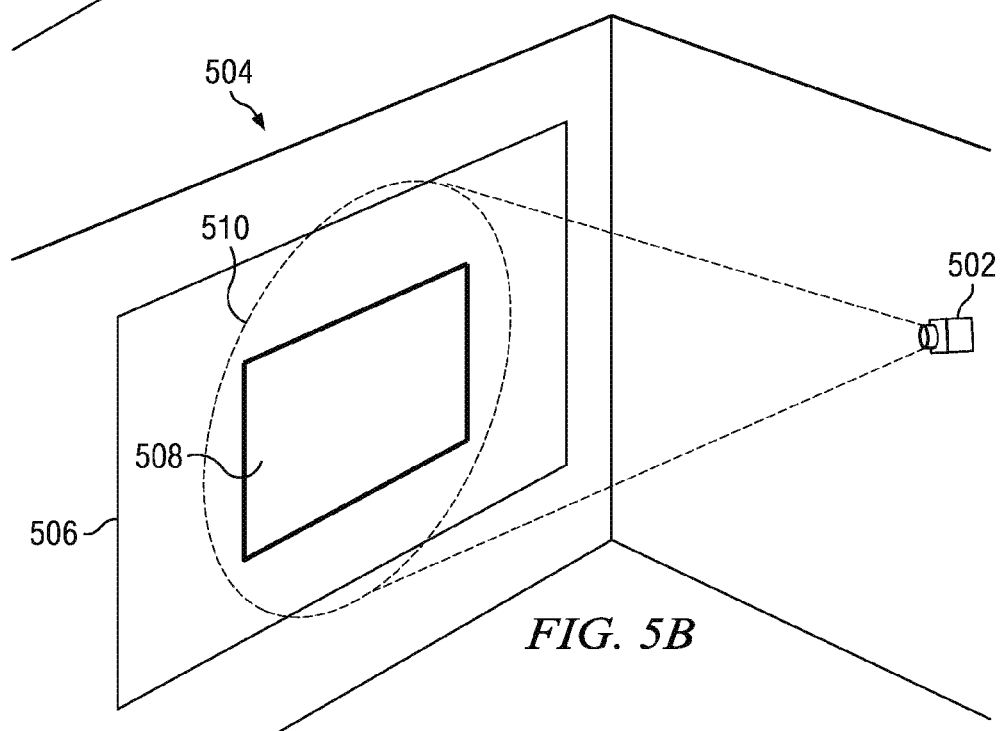
FIG. 5B is a diagram of a display system illustrating one example of resealing an image based on the size of an interaction area on a projection surface.

FIG. 5B is a diagram of a display system illustrating one example 504 of rescaling an image based on the size of an interaction area on a projection surface. The processor may rescale the image 508 such that it is displayed within the interaction area 510 such that an input relative to the projected image may be detected by an optical sensor capable of detecting images relative to the interaction area 510. For example, the image 508 is shown to be rescaled such that it is projected within the interaction area 510.

Using an optical sensor to sense an input to a projection surface may provide a cheaper more portable system for touch and gesture input. For example, the location and size of the display may be more easily adjusted. Such a system may be used, for example, for presentations, or for multiple users interacting with a projected image.

The invention claimed is:

1. A method, comprising:
    performing by at least one processor:
        controlling a projector to project an image content onto a projection surface in a region defining a display area;
        receiving captured images captured by at least one optical sensor of the projected image content on the projection surface;
        detecting, in the captured images, user touches of a plurality of designated locations of the projected image content on the projection surface;
        determining a position of an interaction area based on the detected user touches;
        determining, based on the determined position of the interaction area, whether the display area and the interaction area coincide;
        in response to determining that the display area and the interaction area coincide, interpreting detected user input in images captured by the at least one optical sensor; and
        in response to determining that the display area and the interaction area fail to coincide, instructing a user to adjust at least one of the projector and the at least one optical sensor so that the interaction area and the display area coincide.

2. The method of claim 1, wherein the determining of whether the display area and the interaction area coincide comprises comparing the position of the interaction area in relation to the display area.

3. The method of claim 2, wherein the determining of whether the display area and the interaction area coincide comprises determining whether a calibration image included in the projected image content is sensed by the at least one optical sensor.

4. The method of claim 2, wherein the determining of whether the display area and the interaction area coincide comprises comparing a size of the interaction area with respect to a size of the projected image content.

5. The method of claim 4, further comprising scaling the projected image content based on comparing the size of the interaction area with respect to the size of the projected image content.

6. The method of claim 1, wherein determining the position of the interaction area is based on detecting the user touches at a plurality of corners of the projected image content.

7. The method of claim 1, wherein determining that the display area and the interaction fail to coincide comprises determining that the display area is outside the interaction area.

8. A display system, comprising:
a projector; and
at least one processor:
control the projector to project an image content onto a projection surface in a region defining a display area;
receive captured images captured by at least one optical sensor of the projected image content on the projection surface;
detect, in the captured images, user touches of a plurality of designated locations of the projected image content on the projection surface;
determine a position of an interaction area based on the detected user touches;
determine, based on the determined position of the interaction area, whether the display area and the interaction area coincide;
in response to determining that the display area and the interaction area coincide, interpret a detected user input in images captured by the at least one optical sensor; and
in response to determining that the display area and the interaction area fail to coincide instruct a user to adjust at least one of the projector and the at least one optical sensor so that the interaction area and the display area coincide.

9. The display system of claim 8, wherein the determining of whether the display area and the interaction area coincide comprises comparing the position of the interaction area in relation to the display area.

10. The display system of claim 9, wherein the determining of whether the display area and the interaction area coincide comprises determining whether a calibration image projected onto the projection surface is detected by the at least one optical sensor.

11. The display system of claim 9, wherein the determining of whether the display area and the interaction area coincide comprises comparing a size of the interaction area with a size of the projected image content.

12. The display system of claim 11, wherein the at least one processor is to scale the projected image content based on comparing the size of the interaction area with the size of the projected image content.

13. The display system of claim 8, wherein the determining of the position of the interaction area is based on detecting the user touches at a plurality of corners of the projected image content.

14. A non-transitory machine-readable storage medium encoded with instructions executable by at least one processor to:
control a projector to project an image content onto a projection surface in a region defining a display area;
receive captured images captured by at least one optical sensor of the projected image content on the projection surface;
detect, in the captured images, user touches of a plurality of designated locations of the projected image content on the projection surface;
determine a position of an interaction area based on the detected user touches;
determine, based on the determined position of the interaction area, whether the display area and the interaction area coincide; and
in response to determining that the display area and the interaction area fail to coincide, instruct a user to adjust at least one of the projector and the at least one optical sensor so that the interaction area and the display area coincide.

15. The non-transitory machine-readable storage medium of claim 14, wherein the determining of whether the display area and the interactive area coincide comprises comparing the position of the interaction area in relation to the display area.

16. The non-transitory machine-readable storage medium of claim 15, further comprising instructions to automatically calibrate the position of the interaction area in relation to the display area based on information received from the at least one optical sensor.

17. The non-transitory machine-readable storage medium of claim 15, wherein the determining of whether the display area and the interaction area coincide comprises comparing a size of the interaction area with a size of the projected image content.

18. The non-transitory machine-readable storage medium of claim 14, further comprising instructions to:
adjust an image based on the interaction area; and
send the adjusted image to the projector.

19. The non-transitory machine-readable storage medium of claim 14, wherein determining the position of the interaction area is based on detecting the user touches at a plurality of corners of the projected image content.

* * * * *